United States Patent
Portoles

(10) Patent No.: US 8,206,531 B2
(45) Date of Patent: Jun. 26, 2012

(54) METHOD FOR PRODUCING A HIGHLY RIGID COMPOSITE MATERIAL ROLLER

(75) Inventor: José Portoles, Queyrac (FR)

(73) Assignee: Epsilon Composite, Gaillan (FR)

( * ) Notice: Subject to any disclaimer, the term of this patent is extended or adjusted under 35 U.S.C. 154(b) by 260 days.

(21) Appl. No.: 11/628,112

(22) PCT Filed: Jun. 2, 2005

(86) PCT No.: PCT/FR2005/050412
§ 371 (c)(1),
(2), (4) Date: Feb. 1, 2007

(87) PCT Pub. No.: WO2005/124212
PCT Pub. Date: Dec. 29, 2005

(65) Prior Publication Data
US 2007/0193676 A1   Aug. 23, 2007

(30) Foreign Application Priority Data

Jun. 4, 2004   (FR) .................................. 04 51113

(51) Int. Cl.
*B65H 81/00* (2006.01)
(52) U.S. Cl. .................... 156/169; 156/173; 156/175
(58) Field of Classification Search .............. 156/166, 156/169, 172, 173, 175, 180, 242, 245
See application file for complete search history.

(56) References Cited

U.S. PATENT DOCUMENTS

| | | | |
|---|---|---|---|
| 3,002,534 A | 10/1961 | Noland | |
| 3,230,981 A | 1/1966 | Levenetz | |
| 3,295,558 A * | 1/1967 | Boris Levenetz | 138/140 |
| 4,051,289 A * | 9/1977 | Adamson | 428/113 |
| 4,223,053 A * | 9/1980 | Brogan | 428/34.5 |
| 4,312,162 A * | 1/1982 | Medney | 52/309.16 |
| 5,249,997 A * | 10/1993 | Nance | 441/1 |
| 6,151,743 A * | 11/2000 | Church et al. | 14/73 |
| 6,231,710 B1 * | 5/2001 | Herup et al. | 156/173 |
| 7,063,763 B2 * | 6/2006 | Chapman, Jr. | 156/175 |
| 2004/0228995 A1 * | 11/2004 | Boaz et al. | 428/36.9 |

FOREIGN PATENT DOCUMENTS

EP   203857 A1 * 12/1986
EP   1 231 423      8/2002

OTHER PUBLICATIONS

Korean Patent Abstract for Patent No. 2002004602 dated Jan. 16, 2002.*
Korean Patent 2002-0004602 machine translation, pp. 1-14.*
Krutchkoff, Lydia, "Pultrusion, Part 1—Process Converts Thermoset Materials Into Finished Shapes Continuously", Plastics Design & Processing, Jul. 1980, pp. 34-38.*
Martin et al, "Pultrsion", from Engineered Materials Handbook, vol. 1 Composites, 1987, pp. 533-543.*
Human Translation of Korean Patent KR 2002-0004602 from USPTO, date unknown.*

* cited by examiner

*Primary Examiner* — Jeff Aftergut
(74) *Attorney, Agent, or Firm* — Young & Thompson

(57) ABSTRACT

The object of the invention is a process for the production of a tube of high stiffness, characterized in that it comprises the following steps:
  producing a first internal tube (10) of a first material,
  placing intermediate members (12) on this first tube, regularly spaced, these intermediate members being made of a composite material
  producing at least one second tube (14) of a second material, about these intermediate members,
  at least one of the first or second tubes being made by filamentary winding. The invention also covers the obtained tube.

20 Claims, 2 Drawing Sheets

METHOD FOR PRODUCING A HIGHLY RIGID COMPOSITE MATERIAL ROLLER

Figure 1A:
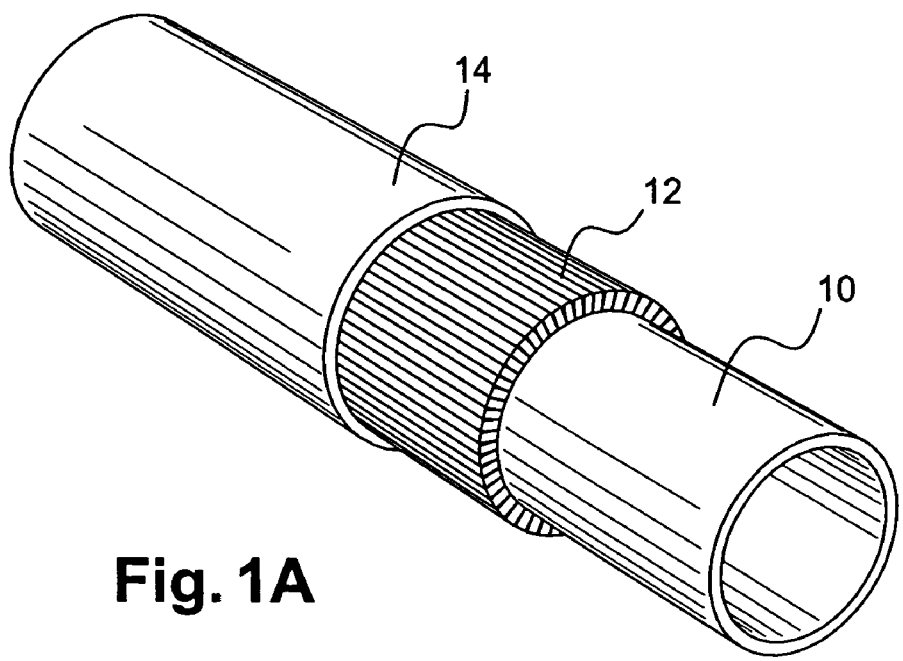

The present invention relates to a process for the production of a tube of composite material of high stiffness, of which at least a portion is made by winding a filament, as well as the tube of composite material thus obtained, particularly for the production of cylindrical support sleeves in the field of printing.

Industries for the transformation of paper and/or plastic, for commercial printing on newspapers and/or packaging, as well as the finish of textiles, requires an improvement in the productivity and hence an increase in the size of machines and their working speed.

Such machines comprise essentially a frame and cylinders used for driving or guiding the bobbin of material to be transformed, but also to take part in this transformation by coating, expressing, laminating or printing said material.

These cylinders are made of steel or of aluminum but with these materials, the weight/inertia/rigidity limit is reached that is necessary for improvement of production whilst preserving the quality of the transformation.

Recourse to carbon fibers has permitted partially satisfying these requirements of speed and width.

Thus, in flexographic printing, the speed has increased from 150 to 250 meters/minute and the width has increased from 900 to 1200 millimeters.

As to the rotatable members for printing newspapers, they work on 6 pages wide, namely, 2000 millimeters of width and at a speed of 15 meters/second.

On the other hand, the production of cylinders based on carbon fibers uses solely and for all of its layers, methods called filamental winding, which require numerous steps. The costs are high and the production, generally one at a time, gives rise to delays in production incompatible with the needs of users of machines with cylinders.

The example used for the description of a particular embodiment according to the invention is the production of a cylinder of composite material applicable particularly to the paper transformation industry, more particularly to printing packaging, without such an example being considered as limiting.

Such cylinders are provided to receive printing sleeves. In this field, the deformations of the support of printers type lead quickly to unacceptable defects and above all, the speed of working is very high for these machines, giving rise rapidly to substantial loss of material.

In the printing field, particularly by flexography, there are provided cylinders, one per color, which support one or several printers plates. These plates receive a very precise quantity of ink in contact with an inking cylinder, which ink is deposited on the paper support, the cardboard or the polymer film by contact. The plate is generally held on a sleeve that can also be made of composite material.

This contact, also called touch, is hence extremely precise and depends on numerous parameters related to the printers plate and to the sleeve. This touch must necessarily be identical at all points of contact along the line of contact, which requires holding possible deformation below a given and very small tolerance.

The sleeve is mounted on a support cylinder which forms a portion of the machine and which is subject to drive means. Such cylinders are generally hollow and made of steel because it is necessary to limit the deformation, particularly deformation under load and the out-of-round which would occur on the sleeve and which would be prejudicial to the printing quality.

These defects are amplified by the high speed of rotation of these cylinders.

Similarly, in the case of printing, the width, upon increasing, also gives rise to increasing sag.

Moreover, these steel cylinders are heavy and generally require lifting means to emplace them.

In the case of narrow width, the deformations arise principally by ovalization of the cylinder under the force of the contact pressure.

In view of these problems, the present invention proposes a process for the production of a tube of composite material of high stiffness, which overcomes the drawbacks of the prior art, of which a portion is produced by winding.

Other advantages of the tube obtained according to the process will become apparent from the disclosed embodiments.

To this end, the process for production of a tube of high stiffness according to the invention is characterized in that it comprises the following steps:
producing a first inner tube of a first material,
depositing intermediate members on this tube, regularly spaced, these intermediate members being of composite material, and
producing at least one second tube, of a second material, positioned on the intermediate members distributed about the first tube, so as to hold these intermediate members between the first and second tubes.

According to an improvement, there is introduced resin or a mixture of resins between the two tubes, in particular to embed the intermediate members and to fill the interstices.

So as to obtain results which will be indicated hereafter, the intermediate members are made of a composite material based on carbon fibers of very high modulus of elasticity, obtained by pultrusion.

Preferably, the intermediate members are obtained from flat profiles made from carbon fibers of very high modulus of elasticity, produced by pultrusion and cut off to ensure positioning on the first tube.

The intermediate members can also be made of a suitable shape as a function of the external diameter of the first tube and of the inner diameter of the second tube.

The invention also covers the composite tube thus obtained.

Figure 1B:
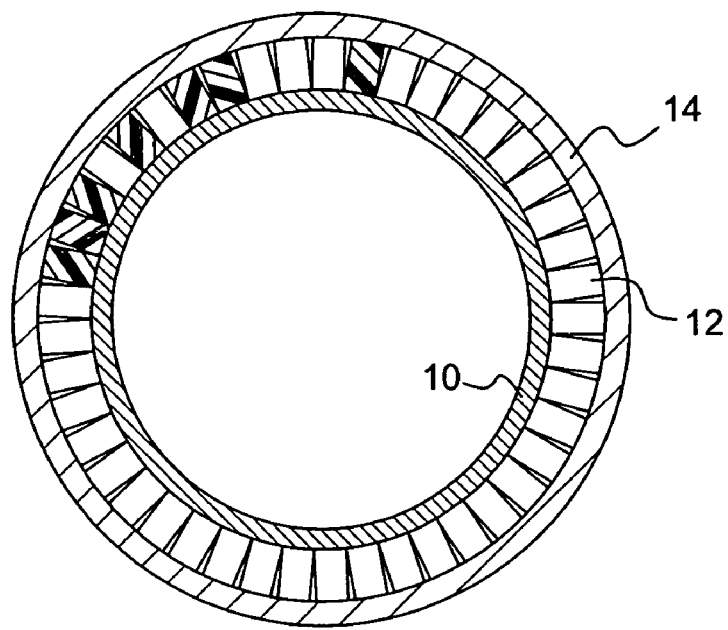
Figure 2:
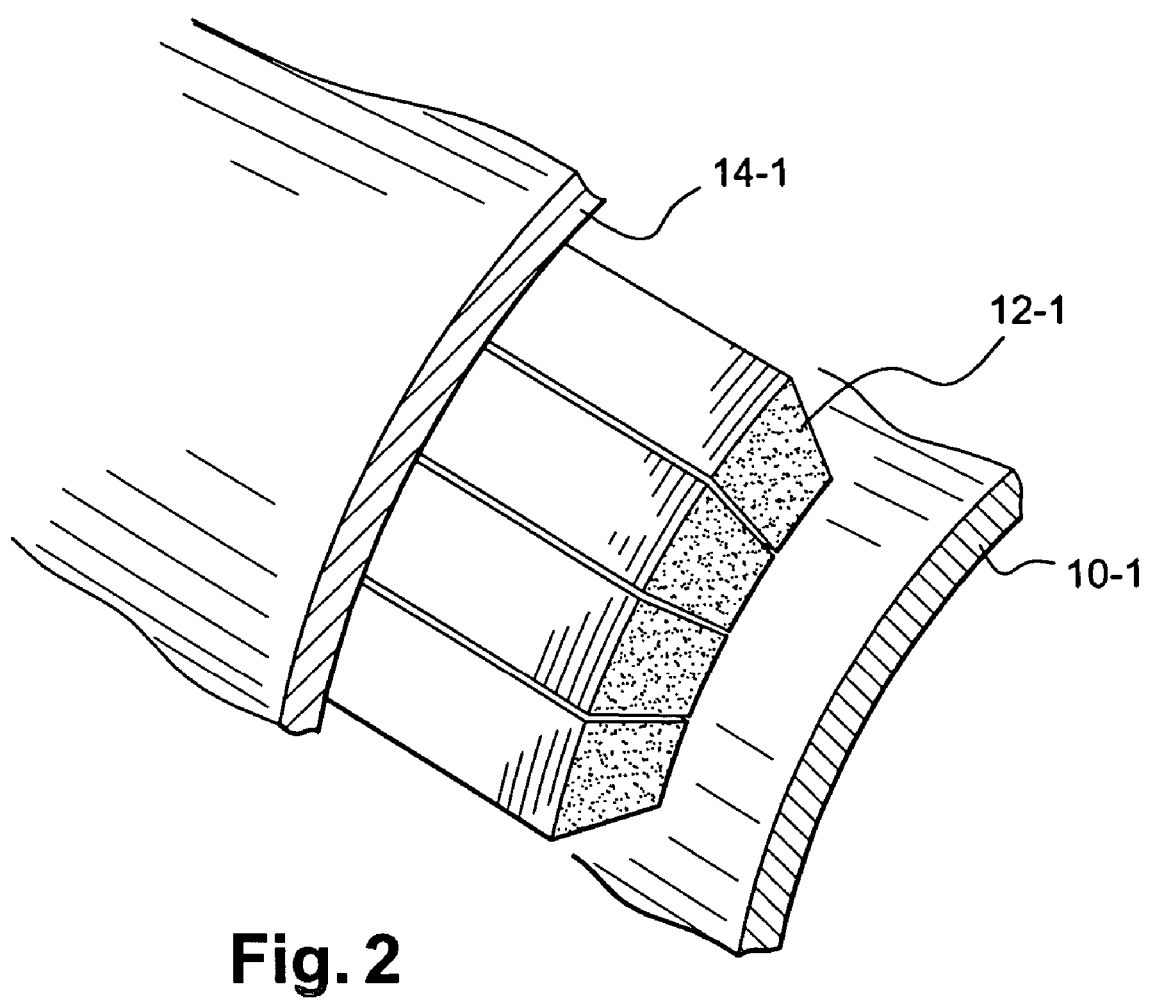

The process according to the present invention will now be described in detail with regard to the schematic drawings, which show:

FIGS. 1A and 1B, two perspective and cross-sectional views, of a first embodiment of a tube according to the invention, and FIG. 2, a view of a second embodiment with shaped intermediate members.

In FIG. 1, there is shown the result of the practice of a process according to the present invention.

This process consists in producing a composite tube with a support core of high rigidity.

This process consists in:
producing a first internal tube 10 of a first material,
positioning unidirectional intermediate members 12, which is to say along the longitudinal axis of this first tube, regularly distributed, these intermediate members being made of a composite material,
positioning at least a second tube 14 about the intermediate members, of a second material. This second material can of course be identical to the first, at least one of these two tubes being made by filamentary winding.

More particularly, the intermediate members are made from carbon fibers by pultrusion.

According to a first embodiment, the two first and second tubes are made of a same material, also based on carbon fibers.

At least one of these tubes is made by filamentary winding, the other being made by pultrusion or any other means and if desired available in commerce.

In the first embodiment, the intermediate members are cut off from flat profiles of composite material based on carbon fiber, the thickness and width of these intermediate members being suitable to the free space between the two coaxial tubes produced by winding.

The assembly is obtained by interposition of these intermediate members 12 between the two first and second tubes (10, 14).

In the case in which the first tube is made by winding, the intermediate members are distributed over the first tube and connected to it by any suitable means, particularly residual resin from the first winding. The second prefabricated tube is then slid over the intermediate members, to obtain at least a first coaxial series.

If the first tube is prefabricated, then the intermediate members are distributed over this first tube and then the second tube is made by filamentary winding, which simultaneously ensures the immobilization of the intermediate members and the construction of the second tube.

The third solution consists in producing the two first and second tubes by filamentary winding. In this case, the first tube is made by winding, the intermediate members are deposited, and then the second tube is produced on the intermediate members.

The arrangement of these intermediate members, no matter what the selected mode for production of the tubes, is necessarily symmetric but can vary according to the stiffness that is sought.

Thus, the intermediate members can be disposed so as to fill up the free space or according to a regular distribution, but while leaving free spaces. Because of this, the stiffness can be increased and adjusted as a function of the applications.

So as to permit immobilization of the intermediate members in this inter-tube space, the process provides a possible step of injection of a resin or of a mixture of resins between the two tubes, which resin will embed the intermediate members and fill the interstices, whilst also ensuring perfect connection of the two tubes in rotation, overcoming any shearing effect.

The term "resin" is used here, because it is a matter of polymers, but one could also accurately speak of cement, because this is the final function. The term resin must not be considered as limiting.

The tube thus obtained is particularly homogeneous. In this first embodiment, the weight of the tube is minimized and the characteristics obtained are surprising and achieve very attractive values.

The intermediate member described in the present invention is made by pultrusion, from carbon fibers of so-called very high modulus of elasticity, sold under the mark Carbolam THM 400.

This fiber permits achieving, with the arrangement according to the present invention, exceptional characteristics.

Thus, the tube obtained all from carbon by the process according to the present invention weighs 5 times less than the same tube of steel for a modulus of elasticity E, 1.7 times greater, reaching 350 GPa.

In the case of FIG. 2, the embodiment consists in pultruding intermediate members 12-1 shaped. This shape may be made optimal as a function of the internal and external diameters to be suitable for the provided inter-tubes space, between the tubes 10-1 and 14-1.

The production of the two tubes is according to the process of the present invention, namely that at least one of the two tubes is made from filamentary winding.

In this case, the filling of material is optimized and the quantity of resin is decreased to its minimum. It is altogether possible to eliminate the resin, even more easily than in the first embodiment, because the contact surfaces between the intermediate members and the two surrounding tubes is further increased. Moreover, during winding of the second tube, the resin can flow slightly into this inter-tube space between the intermediate members.

It will be noted that in the case of an all-carbon tube, the external surface can be coated with a surface resin permitting truing to obtain a diameter of high precision and a reduction of out of round with the same tolerances.

The advantage of the process according to the present invention is to permit the production of a support with at least one internal tube and intermediate members in inter-tube spaces, these latter being produced of pultruded carbon.

As to the material of the external tube, the user can select its nature without substantially losing the characteristics of the final product. Thus, if only the inner tube is produced by winding, the external tube can be prefabricated metal and slid over the intermediate members themselves disposed on the first tube.

Another problem combated by the tubes produced by the process of the present invention, is deformation by ovalization. In the case of a narrow width of the order of 1 meter, the large forces exerted on a generatrix of the tub lead to its ovalization.

The intermediate members permit obtaining a rigidification of the cross-section of the tube and preserving a circular cross-section.

Even if the sag is of a less critical parameter, the arrangement with the intermediate members which form a more or less dense support to permit compensating deformations under force.

Thus, as a function of the applications, the number and arrangement of the intermediate members can be adjusted to achieve satisfactory results at lowest cost.

The tubes according to the present invention also contribute to solving the problem of parasitic vibrations generated in the case of rotary machines.

As indicated, the linear speeds of movement can be up to 1,500 meters/minute, which leads to high speeds of rotation and hence inevitable vibrations.

In the case of printing for example, the vibrations give rise to defects that substantially decrease quality, even leading to rejected product.

However, the structure with at least internal tube and intermediate members supporting an external tube, gives rise to ruptures of propagation, which are overcome by changing the nature of the materials, which avoids at least the transmission of identical frequencies as takes place in monolithic materials.

The invention has been described with a structure comprising two tubes and intermediate members disposed in the inter-tube space, but it is possible to provide another internal tube with another set of intermediate members disposed in the new inter-tube space thus produced, with production by winding or from a prefabricated tube and the introduction of the intermediate members.

This arrangement can be of interest to avoid vibrations as much as possible.

Although other more complicated arrangements can be envisaged with a larger number of tubes, they will be reserved for exceptional cases so as not to depart from the sought scope of industrial production with the arrangement of the present invention.

The invention claimed is:

1. A process for producing a roller of high stiffness for a rotary production machine, comprising:
   producing a first inner tube (10) of a first material;
   placing intermediate members (12) on said produced first inner tube with a regular spacing, said intermediate members being solid in cross-section and obtained by pultrusion, said members being made of a composite material based on carbon fibers; and
   producing at least one second tube (14) of a second material, disposed about the intermediate members, thereby forming a cylindrical roller of a rotary production machine,
   wherein one of the first and second tubes is made by filamentary winding and an other of the first and second tubes is obtained by pultrusion.

2. The process according to claim 1, wherein one of a resin and a mixture of resins is introduced between the two tubes (10, 14) to embed the intermediate members, fill interstices between the intermediate members, and also ensure connection of the two tubes in rotation.

3. The process according to claim 2, wherein the composite material is used for at least one of the tubes and for the intermediate members, the composite material based on carbon fibers of very high modulus of elasticity and obtained by pultrusion.

4. The process according to claim 2, wherein the intermediate members are obtained from flat profiles made of carbon fibers of very high modulus of elasticity obtained by pultrusion and cut off.

5. The process according to claim 2, wherein the intermediate members are shaped to produce sectors.

6. The process according to claim 1, wherein the composite material is used for at least one of the tubes and for the intermediate members, the composite material based on carbon fibers of very high modulus of elasticity.

7. The process according to claim 6, wherein the intermediate members are obtained from flat profiles made of carbon fibers of very high modulus of elasticity obtained by pultrusion and cut off.

8. The process according to claim 6, wherein the intermediate members are shaped to produce sectors.

9. The process according to claim 1, wherein the intermediate members are obtained from flat profiles made of carbon fibers of very high modulus of elasticity obtained by pultrusion and cut off.

10. The process according to claim 9, wherein the intermediate members are shaped to produce sectors.

11. The process according to claim 1, wherein the intermediate members are shaped to produce sectors.

12. The process according to claim 1, wherein each of the intermediate members (12) have a first side with a first width and a second side, opposite said first side, with a second width, said second width being greater than said first width.

13. The process according to claim 12, wherein the first sides of the intermediate members (12) are disposed on the first inner tube (10), and the second sides of the intermediate members (12) are disposed on the second tube (14).

14. The process according to claim 1, wherein said placing step is performed after said producing step produces said first inner tube (10).

15. The process according to claim 1, wherein said intermediate members (12) are unidirectional and are placed along the longitudinal axis of the first inner tube (10).

16. The process according to claim 1, wherein said intermediate members (12) are placed in a manner as to be parallel to each other and to each extend in a direction along the longitudinal axis of said first inner tube (10) at least over a length of said first inner tube (10).

17. The process according to claim 1, wherein the production machine is a printing machine.

18. A process for producing a roller of high stiffness for a rotary production machine, comprising:
   producing a first inner tube (10) of a first material;
   placing intermediate members (12) on said produced first inner tube with a regular spacing, said intermediate members being solid in cross-section and made of a composite material based on carbon fibers; and
   producing at least one second tube (14) of a second material, disposed about the intermediate members, thereby forming a cylindrical roller of a rotary production machine,
   wherein at least one of the first and second tubes is made by filamentary winding.

19. The process according to claim 18, wherein the production machine is a printing machine.

20. A process for producing a roller of high stiffness for a printing machine, comprising:
   producing a first inner tube (10) of a first material;
   placing intermediate members (12) on said produced first inner tube with a regular spacing, said intermediate members being solid in cross-section and made of a composite material based on carbon fibers; and
   producing at least one second tube (14) of a second material, disposed about the intermediate members, thereby forming a cylindrical roller of a printing machine,
   wherein at least one of the first and second tubes is made by filamentary winding.

* * * * *